(12) United States Patent
Panebianco

(10) Patent No.: US 10,307,953 B2
(45) Date of Patent: Jun. 4, 2019

(54) AUTOMATIC SCREEN CHANGER DEVICE

(71) Applicant: ALFATECH S.R.L., Tradate (Varese) (IT)

(72) Inventor: Luigi Panebianco, Tradate (IT)

(73) Assignee: ALFATECH S.R.L., Tradate (Varese) (IT)

( * ) Notice: Subject to any disclaimer, the term of this patent is extended or adjusted under 35 U.S.C. 154(b) by 1250 days.

(21) Appl. No.: 14/248,546

(22) Filed: Apr. 9, 2014

(65) Prior Publication Data
US 2014/0305853 A1 Oct. 16, 2014

(30) Foreign Application Priority Data

Apr. 12, 2013 (IT) .............................. MI2013A0597

(51) Int. Cl.
B29C 47/68 (2006.01)
B29C 47/08 (2006.01)

(52) U.S. Cl.
CPC .......... *B29C 47/683* (2013.01); *B29C 47/081* (2013.01); *B29C 47/0884* (2013.01); *B29C 47/685* (2013.01)

(58) Field of Classification Search
CPC ................................ B01D 29/09; B01D 35/18
See application file for complete search history.

(56) References Cited

U.S. PATENT DOCUMENTS 3,855,126 A 12/1974 Smith
3,950,484 A * 4/1976 Egli ........................ B29C 44/42
264/328.19
(Continued)

FOREIGN PATENT DOCUMENTS

DE 197 22 352 11/1997
EP 0 275 462 7/1988
(Continued)

OTHER PUBLICATIONS

Italian Search Report dated Dec. 3, 2013, corresponding to the Foreign Priority Application No. MI 20130597.
(Continued)

Primary Examiner — Krishnan S Menon
Assistant Examiner — Brad Gordon
(74) Attorney, Agent, or Firm — Young & Thompson

(57) ABSTRACT

An automatic screen changer device for use on systems and equipments for the manufacturing, processing, recycling and treatment of thermoplastic materials, is placed downstream of an extruder device and includes a frame (12), two opposite side plates or shoulders secured to the frame and provided, respectively, with an inlet opening (18) and a pair of inlet channels (30), with an outlet opening (20) and with a pair of outlet channels (32), the inlet channels allowing a flow and a screening of contaminated molten material in the direction of the outlet channels through a pair of stacked screening units; the device likewise includes movable sealing and locking/unlocking elements of a screening support or band for the screening of the molten material in each screening unit with the latter movable reciprocally with temporary interruption of the flow of molten material through one of the same screening units during the screen change.

7 Claims, 4 Drawing Sheets

(56) References Cited

U.S. PATENT DOCUMENTS

| | | | |
|---|---|---|---|
| 4,159,953 A * | 7/1979 | Paquette | ............... B01D 29/09 |
| | | | 210/396 |
| 4,849,113 A | 7/1989 | Hills | |
| 5,320,753 A | 6/1994 | Keillor, III | |
| 6,216,880 B1 * | 4/2001 | Previero | ............. B01D 29/096 |
| | | | 210/359 |

FOREIGN PATENT DOCUMENTS

| | | |
|---|---|---|
| EP | 0 976 525 | 2/2000 |
| GB | 1446710 A | 8/1976 |
| WO | 02/00321 | 1/2002 |

OTHER PUBLICATIONS

European Search Report, dated Jul. 16, 2014, from corresponding EP application.

\* cited by examiner

AUTOMATIC SCREEN CHANGER DEVICE

FIELD OF THE INVENTION

The object of the present invention is an automatic screen changer device.

More particularly the present invention relates to an automatic screen changer device especially suitable for being used on systems and machinery for manufacturing, processing and treatment of thermoplastic materials.

BACKGROUND OF THE INVENTION

As is known, in the production of extruded products in soft or rigid thermoplastic material of the strip, sheet, pipes or sections, films or flat heads type or similar manufacture, materials are used of the PP (polypropylene), PE (polyethylene), PET (polyethylene terephthalate), ABS (acrylonitrile butadiene styrene) type and the like, which can have contaminating elements or impurities such as iron, wood, paper or textile fibres, small percentages of aluminium or lead or the like, harmful to the good quality and features of the material treated and of the product to be made. This condition is particularly frequent in the case of recycling of materials.

Moreover, in the sector of recycling of industrial reject plastic materials or those coming from differentiated waste collection, it is important to eliminate the impurities completely in order to obtain a material of good quality to be subjected to regranulation.

In order to obtain a material without the aforementioned impurities it is necessary to perform screening of the material being made, performed by means of a screen positioned between the extruder apparatus and the cutting apparatus.

These screens, due to the impurities or contaminants present in the thermoplastic materials, have to be cleaned periodically or preferably replaced and, therefore, are provided with screen changer devices.

The screen changer devices are of different production types as a function of the method of replacement of the screen and of management of the flow of molten material during the same replacement.

Some screen changer devices are actuated manually; this entails the burdensome disadvantage of having to intervene manually in order to be able to proceed with replacement of the screen with a consequent increase in the costs linked to labour, down times and substantially to production.

Other technical solutions provide for the use of automatic systems in which the flow of molten material is temporarily interrupted, accumulating it in a storage cylinder and releasing it when the replacement of the screen has been carried out.

However these solutions, even if they do not need the manual intervention of an operator for performing the operation of replacement of the screen, entail, in any case, a temporary interruption of the flow of material which on some continuous applications, of the sheet or profiles type, cannot be used, with a consequent extension of the times of production/manufacture and correlated costs.

For example EP 0976525 illustrates a complex screening device for plastic particulate material which comprises a body provided with a screening chamber inside whereof are placed transversely a screening band, valves with axial movement controlled and actuated by control means of the actuators type and suitable for enabling/disabling the passage of the flow of plastic material through the conduits and the screening band, means of locking and sealing in place of the screening band at an annular portion of a perforated discoidal element placed inside the screening chamber and, likewise, a cut-off valve co-operating with said valves with axial movement for enabling/disabling the flow of material through the conduits.

U.S. Pat. No. 3,855,126 describes a suitable device for screening of contaminating elements present in a plastic material which comprises an element of containment or chamber, a screening means of the screening band type sliding and placed between an inlet compartment and an outlet one, means of gripping and moving forwards these screening means in the containment chamber and means suitable for ensuring the sealing of the screening band with respect to the chamber so as to avoid possible losses of said contaminating elements. However this device or apparatus has a considerable disadvantage linked to the need to have to interrupt the flow of material during the phase of forward movement of the screening band for the replacement of the same.

U.S. Pat. No. 4,849,113 describes another known device or apparatus suitable for the screening of polymeric materials which, in particular, comprises a cut-off valve suitable for blocking the flow of material through a conduit so as to allow the passage thereof in another conduit and to allow the replacement or moving of a screening band at the conduit closed by the aforementioned valve. However this solution also has some disadvantages linked to the constructional complexity and to the losses of plastic material with consequent increases in the costs of production.

Other automatic screen changer systems provide for the use of cartridge filters provided with a scraper which acts on a micro-perforated lamina placed inside the screen body.

However these solutions too have some important disadvantages linked to the fact that the scrapers tend to limit the screening of the molten material and entail the rejecting of a good percentage of molten material.

SUMMARY OF THE INVENTION

The object of the present invention is that of avoiding the disadvantages mentioned above.

More particularly the object of the present invention is that of introducing a screen changer device of the automatic type such as not to require the presence of an operator for performing the operation of replacement of the screen.

A further object of the present invention is that of creating an automatic screen changer device suitable for ensuring a continuity of the flow of molten material and, simultaneously, the screening of the same material without jeopardising the quality of the end product.

A further object of the present invention is that of having an automatic screen changer device suitable for allowing a reduction in the times of production and of the correlated costs.

A further object of the present invention is to make available to users an automatic screen changer device suitable for ensuring a high level of resistance and reliability in time and such, moreover, as to be easily and economically produced.

According to the invention an automatic screen changer device is provided, comprising a frame, two opposite side plates or shoulders secured to said frame and provided, respectively, with an inlet opening and a pair of inlet channels, with an outlet opening and with a pair of outlet channels, said inlet channels suitable for allowing a flow and a screening of contaminated molten material in the direction of the outlet channels through a pair of stacked screening units, said device comprising, moreover, movable sealing and locking/unlocking means of a screening support or band for the screening of said molten material in each screening unit with the latter movable reciprocally with temporary interruption of the flow of molten material through one of said same screening units.

Advantageous embodiments of the invention are disclosed by the dependent claims.

BRIEF DESCRIPTION OF THE DRAWINGS

The constructional and functional features of the automatic screen changer device of the present invention will be made clearer by the following detailed description, in which reference is made to the accompanying drawings which represent a preferred and non-limiting embodiment thereof, in which.

DETAILED DESCRIPTION OF THE INVENTION

Figure 1:
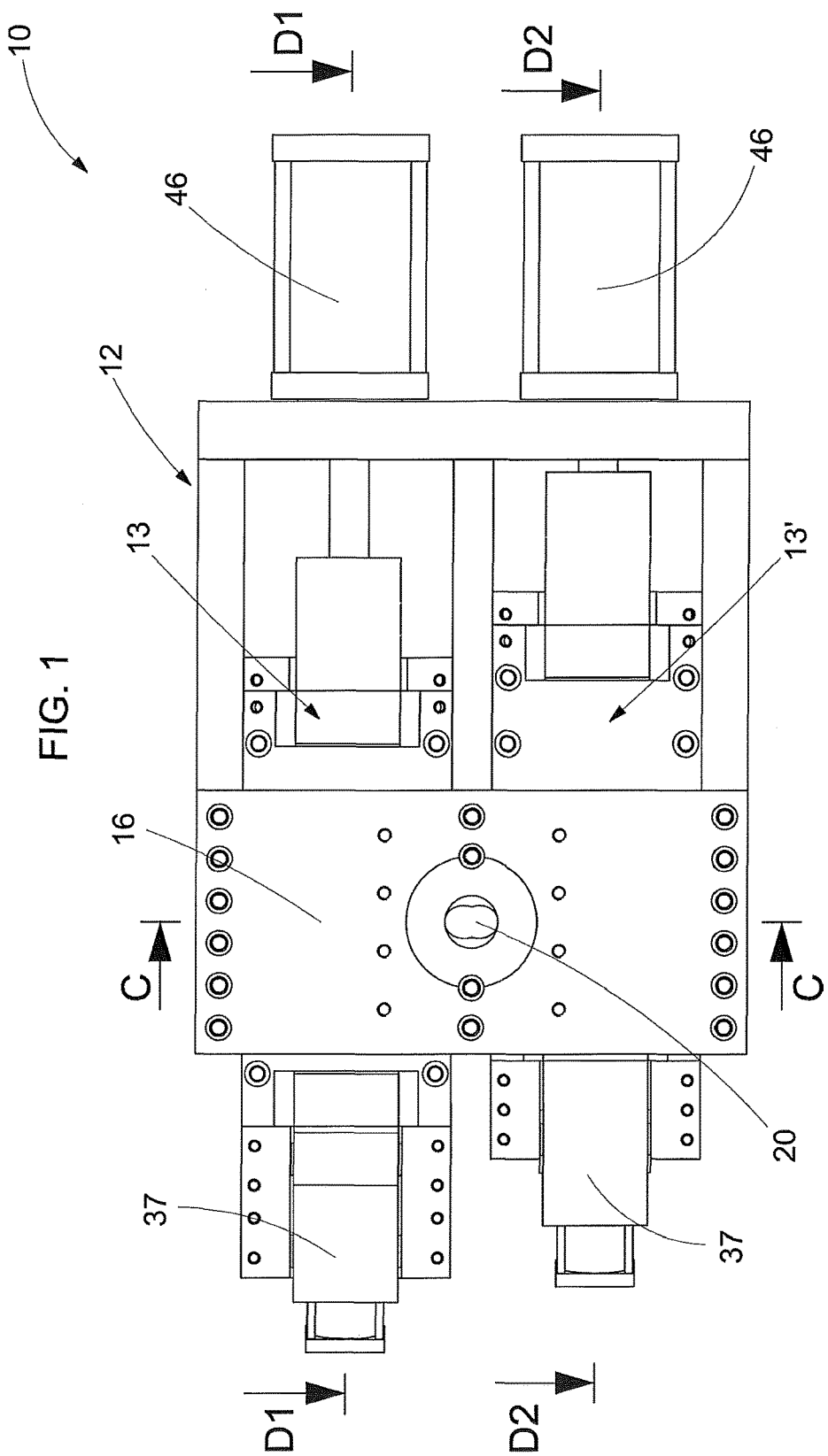
FIG. 1 represents schematically a front view of the automatic screen changer device of the present invention.

Referring to the aforesaid drawings, the automatic screen changer device of the present invention, denoted overall by 10, comprises a frame 12 with respect whereto two screening units 13 and 13' are positioned, one upper and one lower, stacked and sliding, according to the methods described here below, with respect to the same frame.

Said frame 12 comprises, moreover, two opposite side plates or shoulders 14 and 16, secured to the same frame 12 by known means and provided, respectively, with an inlet opening 18 and an outlet opening 20 suitable for allowing the flow of incoming molten material to be screened, coming from an extruder device (placed upstream of the device of the invention) and the outgoing flow of screened material in the direction of optional devices positioned downstream of the same screen changer device (for example a cutting device).

Each screening unit 13 and 13' comprises (the reference numerals for the two screening units are the same in that they comprise similar constituent elements) two opposite plates, a first plate 22 placed on the inlet side of the material and a second plate 24 placed on the outlet side, facing and rigidly constrained one to the other by means of screws or similar holding means.

The first plate 22 and the second plate 24 have, respectively, a first chamber 26 and a second chamber 28, whereof one (the first chamber 26) suitable for allowing the flow of the contaminated and molten material coming from the extruder (not shown in the drawing) through an inlet conduit 30 of the side plate 14 and the other (the second chamber 28) suitable for allowing the flow of the screened material in the direction of the apparatuses placed downstream of the screen changer device through an outlet conduit 32 of the side plate 16.

Figure 3:
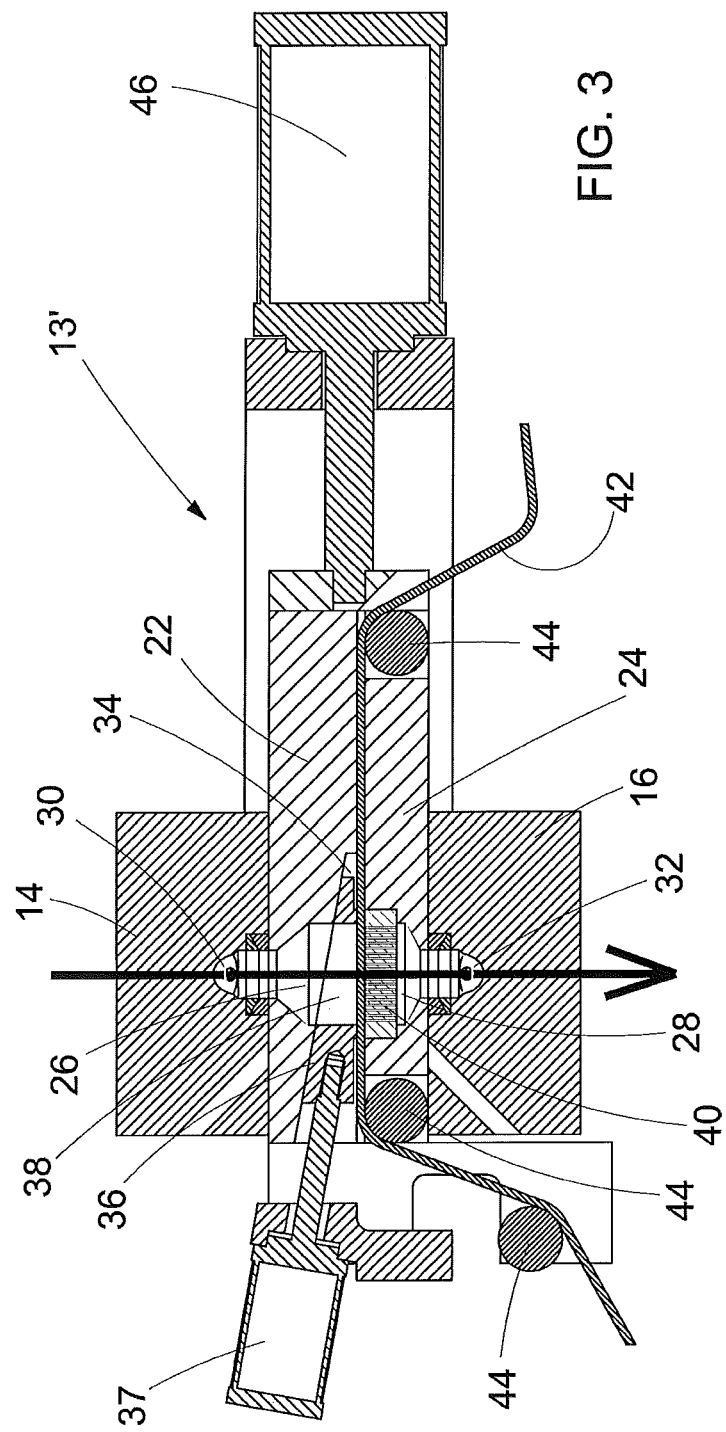
FIG. 3 represents schematically a further longitudinal section of the same device along a plane D2-D2 as per FIG. 1.

The first plate 22 has a pocket 34 which, starting from the front facing the second plate 24, develops longitudinally with a wedge-shape trend in the direction of an end or external lateral front of the first plate and has the function of accommodating a mobile wedge 36 provided with a through hole 38 having a shape corresponding to that of the first chamber 26 of the first plate. Said wedge has the function of performing a forcing/sealing of the elements described here below and in the working condition, as schematised in FIG. 3; the through hole 38 is coaxial to the first chamber 26 so as to allow the passage of molten material through the same.

The second plate 24 houses, in the second chamber 28, a perforated plate 40 known as "breaker" which acts as support for the screening support and is suitable for the passage of the molten and screened material as described here below.

The first plate 22 and the second plate 24, when facing and in contact as schematised in the accompanying drawings, define an intermediate seat longitudinally developed along the whole length of said plates and having the function of accommodating a screening support or band 42 sliding inside said seat, in a direction perpendicular to the axis of the first chamber 26 and of the second chamber 28, supported by rollers 44 and co-operating with the wedge 36 which guarantees the sealing and the sliding release of said screening support. The rollers 44 are rotatably actuated by a motor (not shown in the drawings), preferably of the hydraulic type.

The first plate 22 and the second plate 24 of the screening units 13 and 13' which, as described previously, are rigidly restrained one to the other and slidingly moved in a longitudinal direction with respect to the frame 12 and to the side plates or shoulders 14 and 16 by means of a drive defined by a cylinder or piston 46 secured to the frame 12.

The wedge 36 is connected to actuator means, defined by a further cylinder or piston 37 with preferably hydraulic drive or another type suitable for the purpose (for example an electric drive or a mechanical drive of the lever type), secured to the single screening unit in a position substantially opposite that of connection of the same with respect to the cylinder or piston 46 and having the function of imposing the sliding of said wedge in the dedicated pocket 34.

The device is moreover provided with sensors (not shown in the drawings) suitable for detecting the values of the pressure of the molten material processed by the screening support 42 and for sending them to a control unit (also not shown) for the actuation and the adjustment of the same device.

The functioning of the screen changer device of the present invention, described in detail above with reference to the technical features, is described here below.

Figure 4:
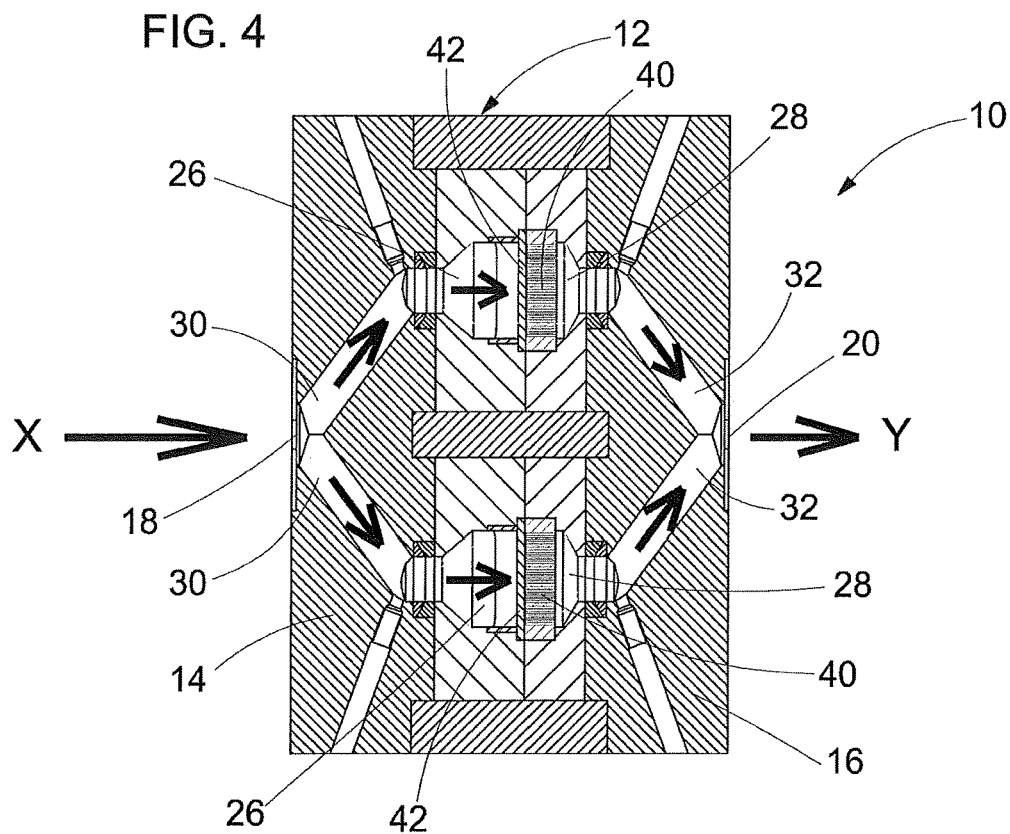
FIG. 4 represents a cross section along a plane C-C of FIG. 1 indicative of a first working position of both the plates of the device of the invention.

Referring to FIG. 4, the condition of normal functioning of the screen changer device is schematised and, more precisely, the condition wherein the screen changer device has not yet been actuated and the two screening units are both in working condition.

In this condition or configuration the flow of molten material coming from the extruder device, as indicated by the arrow X, enters the screen changer device through the inlet opening 18, flows inside the inlet conduits 30 of the upper screening unit 13 and of the lower screening unit 13', flows in the first chamber 26, through the hole 38 of the wedge 36, the screening support 42 and the perforated plate 40 of the second chamber 28 and, flowing into the outlet conduits 32 (as indicated by the arrows in the drawing), leaves the outlet opening 20 in the direction of the devices placed downstream of the screen changer device, as indicated by the arrow Y.

During the passage of the molten material as defined above, the screening support 42 retains the impurities contained in the molten material creating a clogging of the screening device and an increase in the pressure in the same up to a limit level preset and detected by the sensors which send a signal to the control unit which commands the change of the screen.

Figure 2:
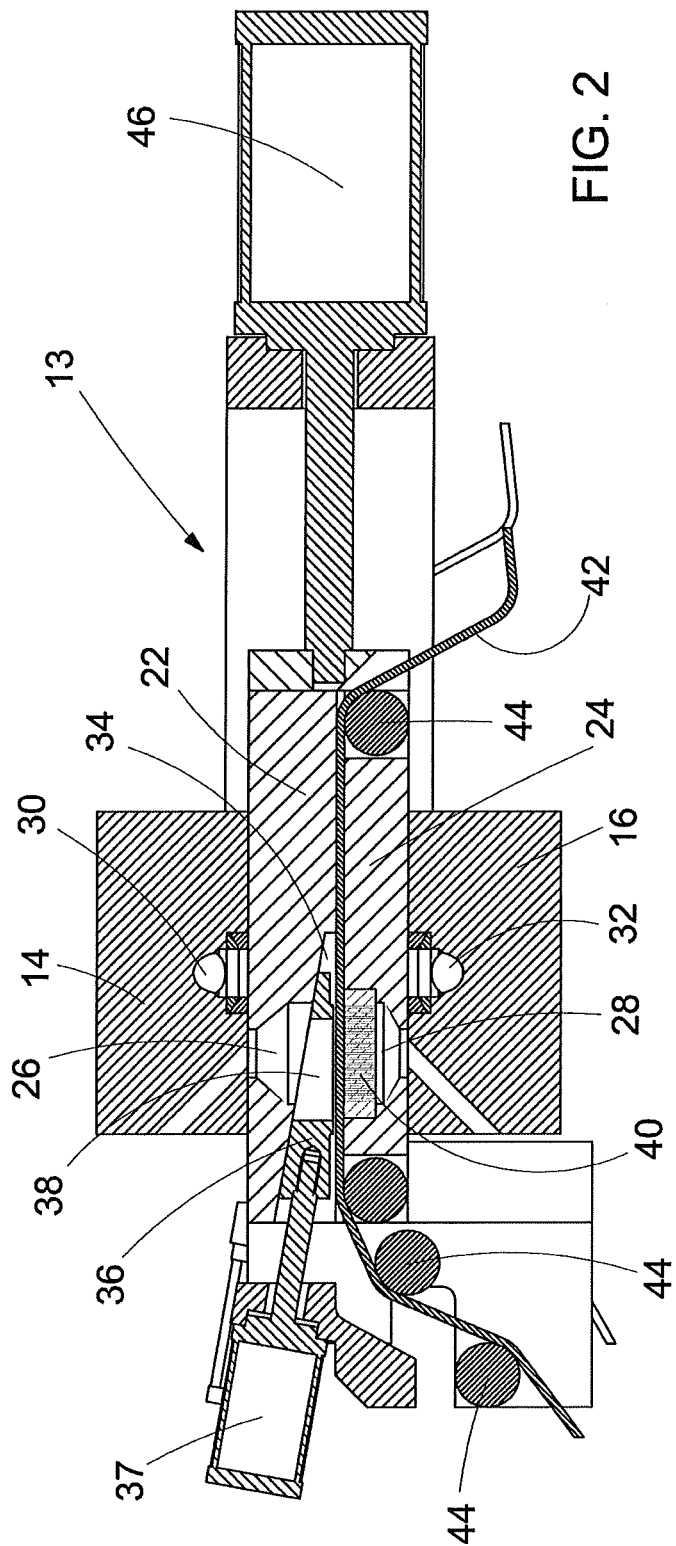
FIG. 2 represents schematically a longitudinal section of the screen changer device of the invention along a plane D1-D1 as per FIG. 1.

In these conditions the control unit actuates the cylinder 46 which, acting on one of the screening units, for example the upper screening unit 13, causes the sliding of the coupled first plate 22 and second plate 24 of the same in longitudinal direction (as schematised in FIG. 2) causing, in this way, the closure of the inlet channel 30 and of the outlet channel 32 of the aforesaid screening unit.

At the same time the further cylinder 37 is actuated which imposes the movement of the wedge 36 and a partial exiting of the same with respect to the corresponding pocket 34, so as to remove the forcing and allow the screening support 42 to slide longitudinally between the first plate 22 and the second plate 24 to replace the soiled surface with a clean one. The control unit imposes the extent of the movement of the screening support 42.

When the clean part of the screening support 42 has replaced the soiled one, the further cylinder 37 imposes the sliding of the wedge 36 in the pocket 34 so as to determine an action of forcing which locks the screening support between the first plate 22 and the second plate 24.

At this point the piston 46 imposes a backward sliding movement of the screening unit, re-establishing the passage through the inlet 30 and outlet 32 channels.

Figure 5:
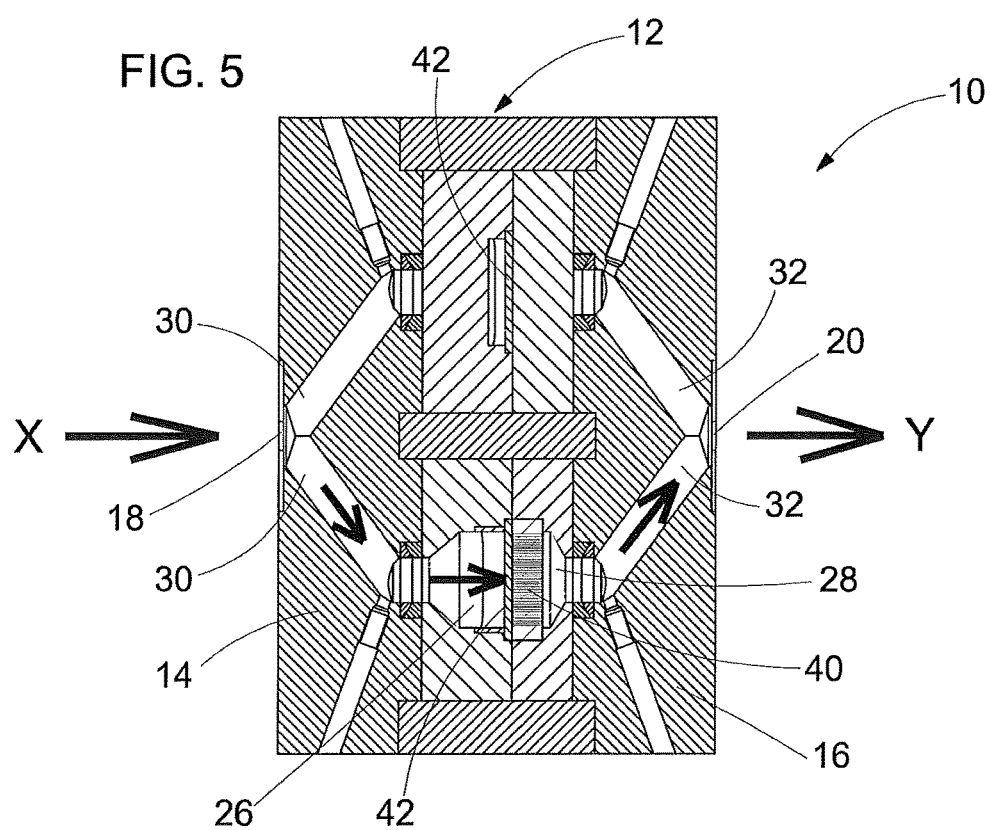
FIG. 5 shows the cross section along the plane C-C indicative of the device of the invention with a plate in working position and with a plate in change position.

It should be noted that, during the phase of screen change, the flow of molten material through the device is not interrupted but instead continues through the screening unit which is not involved by the screen change (as schematised by the arrows in FIG. 5). In practice, alternatively, a screening unit finds itself in condition of screen change, while the other in working condition.

As can be seen from the following, the advantages that the device of the invention achieves are clear.

The automatic screen changer device of the present invention allows advantageously the performing of the replacement of the screen in a totally automatic manner and without any external intervention by an operator.

A further advantage is represented by the fact that the device of the invention allows the performing of the replacement of the screen without interrupting the sliding of the molten material and the continuity of the flow and of the production cycle, ensuring the quality of the end product and the containing of the production costs.

Although the invention has been described above with particular reference to its methods of manufacture given only by way of a non-limiting example, numerous changes and variations will appear clear to a person skilled in the art in light of what is disclosed above. The present invention therefore intends to embrace all the changes and variations which come within the scope of the following claims.

The invention claimed is:

1. An automatic screen changer device for the manufacturing, processing, recycling, and treatment of thermoplastic materials said device comprising:

a frame;
two opposite side plates or shoulders secured to said frame and provided, respectively, with an inlet opening and an outlet opening;
a pair of stacked screening units, each screening unit comprising:
a screen,
an inlet channel and an outlet channel, wherein said inlet channel allows a flow and a screening of molten material in a direction of the outlet channel;
a screening support or band, said screening support or band adapted for screening of said molten material;
a first plate placed on an inlet side for the molten material, a second plate placed on an outlet side for the molten material, said first plate and said second plate being restrained one to the other, each of said first and second plates being configured to slide in a longitudinal direction, said first and second plates accommodating said screening support or band therebetween, wherein the first plate comprises a wedge-shaped pocket;
a movable wedge interposed between the first plate and the second plate, said wedge having a through hole configured to provide passage of the molten material from the inlet channel, said wedge being configured to slide in the longitudinal direction inside the wedge-shaped pocket formed in the first plate;
wherein said inlet opening is configured to allow the molten material to pass into each of the inlet channels;
wherein said outlet opening is configured to receive molten material from each of the outlet channels; and
wherein the screening units are configured to be slidingly movable longitudinally with respect to the frame and to the opposite side plates or shoulders and wherein said screening units are further configured to be reciprocally movable with temporary interruption of the flow of molten material through one of said screening units during a screen change.

2. The screen changer device according to claim 1, further comprising a mechanism that moves each screening unit, the mechanism being a cylinder or piston with a hydraulic drive secured to the frame.

3. The screen changer device according to claim 1, wherein the first plate and the second plate are coupled and comprise an intermediate seat configured to receive the screening support or band sliding inside said intermediate seat, the screening support or band being supported by rollers rotatably driven by a motor.

4. The screen changer device according to claim 1, wherein a cylinder or piston with a hydraulic drive secured to one of the pair of screening units in a position opposite to that of connection of the same screening unit with respect to the cylinder or piston is configured to slide the wedge.

5. The screen changer device according to claim 3, wherein the first plate and the second plate comprise, respectively, a first chamber and a second chamber for sliding of the molten material before and after the screening, wherein the second chamber houses a plate perforated in an axial direction.

6. The device according to claim 5, wherein the through hole of the wedge has a shape bounded by the first chamber of the first plate.

7. The screen changer device according to claim 1, further comprising pressure sensors for detecting the pressure of the molten material processed by the screening support or band.

* * * * *